(12) United States Patent
Chen

(10) Patent No.: US 7,913,527 B2
(45) Date of Patent: Mar. 29, 2011

(54) LOCKING DEVICE FOR A CONNECTING PORT ON A COMPUTER

(76) Inventor: Yen-Hsiang Chen, Taipei County (TW)

( * ) Notice: Subject to any disclaimer, the term of this patent is extended or adjusted under 35 U.S.C. 154(b) by 353 days.

(21) Appl. No.: 12/187,088

(22) Filed: Aug. 6, 2008

(65) Prior Publication Data

US 2010/0031710 A1 Feb. 11, 2010

(51) Int. Cl.
*E05B 65/00* (2006.01)
(52) U.S. Cl. .................. 70/57; 70/14; 70/58; 439/133
(58) Field of Classification Search ............... 70/14, 18, 70/57, 58, 312, 314, 315; 439/133, 137
See application file for complete search history.

(56) References Cited

U.S. PATENT DOCUMENTS

| | | | | |
|---|---|---|---|---|
| 6,058,744 A * | 5/2000 | Ling | ...................... | 70/28 |
| 6,991,479 B2 * | 1/2006 | Miao | ...................... | 439/133 |
| 7,275,941 B1 * | 10/2007 | Bushby | ...................... | 439/133 |
| 7,305,714 B2 * | 12/2007 | Hamaguchi et al. | ...................... | 726/34 |
| 7,390,201 B1 * | 6/2008 | Quinby et al. | ...................... | 439/133 |
| 7,428,834 B1 * | 9/2008 | Lee | ...................... | 70/57 |
| 7,479,021 B2 * | 1/2009 | Huang | ...................... | 439/133 |
| 7,581,417 B1 * | 9/2009 | Chen | ...................... | 70/57 |
| 7,635,272 B2 * | 12/2009 | Poppe | ...................... | 439/133 |
| 7,677,065 B1 * | 3/2010 | Miao | ...................... | 70/57 |
| 7,722,369 B2 * | 5/2010 | Bushby | ...................... | 439/134 |
| 2004/0074264 A1 * | 4/2004 | Kung et al. | ...................... | 70/58 |
| 2005/0039502 A1 * | 2/2005 | Avganim | ...................... | 70/58 |
| 2006/0107073 A1 * | 5/2006 | Lane et al. | ...................... | 713/194 |
| 2007/0037454 A1 * | 2/2007 | Bushby | ...................... | 439/680 |
| 2009/0042433 A1 * | 2/2009 | Bushby | ...................... | 439/352 |

* cited by examiner

*Primary Examiner* — Suzanne D Barrett
(74) *Attorney, Agent, or Firm* — WPAT, P.C.; Anthony King

(57) ABSTRACT

A locking device includes an enclosure having an insertion section formed with two holes for inserting into a connecting port on a computer, and a plurality of windows axially spaced on at least one side of the enclosure; a locking unit arranged in the enclosure and including a rod having axially spaced teeth, a push member connected to one end of the rod and having an engaging portion, a hooking member movably connected to the engaging portion with two hooking arms extended into the two holes on the insertion section; an elastic member located between the push member and the fixing seat; a plurality of rotating discs fitted on the rod corresponding to the windows and each having a plurality of numeral areas and a notch; and at least one push button movably arranged on at least one lateral side of the enclosure to interfere with the push member.

5 Claims, 6 Drawing Sheets

LOCKING DEVICE FOR A CONNECTING PORT ON A COMPUTER

FIELD OF THE INVENTION

The present invention relates to a locking device for a connecting port on a computer, and more particularly to a locking device that can be locked to a connecting port on a computer to hinder any unauthorized external storage device from connecting to the connecting port. Therefore, data stored on the computer are protected against unauthorized access.

BACKGROUND OF THE INVENTION

With the rapidly developed information technologies, computer has become one of many prerequisite electronic products in people's daily life. Computers are used in word processing, storage and processing of video files, audio files, multimedia files, and other important digital data, etc. In general, a computer is equipped with a hard disk drive, a compact disk drive, a floppy disk drive, etc. for reading and storing data. A computer can also be connected to various portable storage devices, such as portable hard disks, USB flash disks, etc., so that data in the computer can be stored on the portable storage device for use at different places.

A portable storage device generally has a universal serial bus (USB) plug as a transmission interface. In use, the USB plug can be directly plugged in a USB connector on a computer case to achieve the effect of Plug and Play for data transmission. Accordingly, with the USB interface, a user can conveniently use the portable storage device. However, due to the Plug and Play effect of the USB interface, even an unauthorized user can freely download all data stored in the computer with any portable storage device. Therefore, personal or private data stored in the computer are dangerously subject to stealing and illegally disclosure.

SUMMARY OF THE INVENTION

A primary object of the present invention is to provide a locking device for a connecting port on a computer. The locking device can be locked to a connecting port on a computer to hinder any unauthorized external storage device from connecting to the connecting port. Therefore, data stored on the computer are protected against unauthorized access.

To achieve the above and other objects, the locking device for a connecting port on a computer according to the present invention includes an enclosure, a locking unit, and at least one push button.

The enclosure has an insertion section formed at a first end thereof, the insertion section being provided with two corresponding holes corresponding to two retaining holes in the connecting port, and having a fixing seat received therein; a plurality of windows formed on at least one of an upper and a lower side of the enclosure; and a supporting plate located in the enclosure at a second end thereof opposite to the first end.

The locking unit is arranged in the enclosure and includes a rod, a push member, a hooking member, an elastic member, a plurality of rotating discs.

The rod has a line of teeth axially spaced on an outer circumferential surface thereof, and is movably connected at one of two ends to the supporting plate and fixedly connected at the other end to an end of the push member.

The push member is provided at another end opposite to the rod with an engaging portion.

The hooking member is movably connected to the push member by engaging with the engaging portion. The hooking member has a first end in the form of a cross plate confined in the enclosure, and an opposite second end in the form of two hooking arms detachably extended into the holes on the insertion section of the enclosure and the retaining holes in the connecting port.

The elastic member is located between the push member and the fixing seat.

The rotating discs are fitted on and around the rod, and each are provided along an outer circumferential surface with a plurality of sequentially arranged numeral areas, such that the numeral areas on the same one rotating disc can be selectively exposed from one of the windows on the enclosure corresponding to that rotating disc by turning the rotating disc. The rotating discs each are also provided on an inner circumferential surface with a notch, which has dimensions corresponding to that of the teeth.

The at least one push button is movably arranged on at least one of two lateral sides of the enclosure to interfere with at least one side of the push member.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
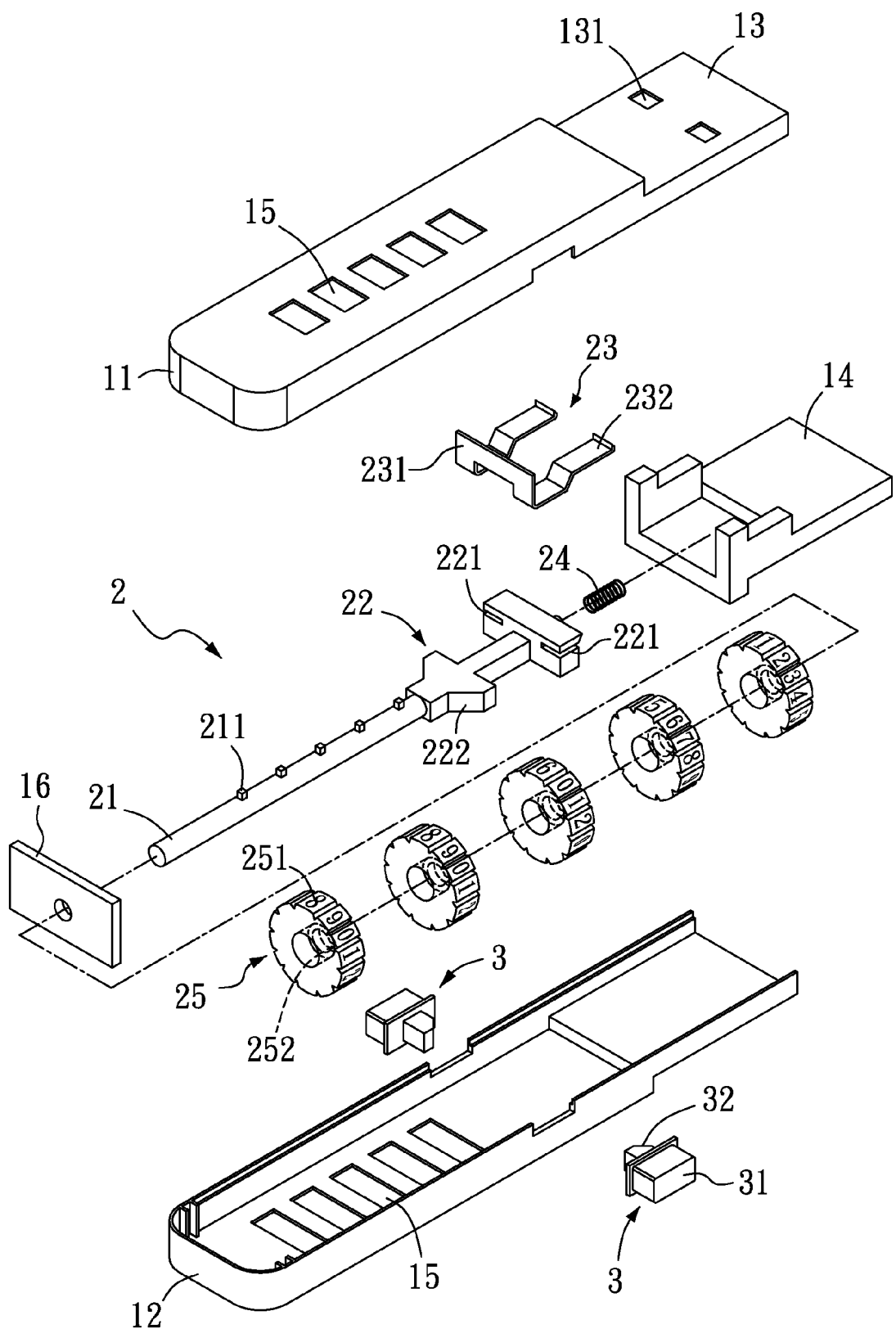
FIG. 1 is an exploded perspective view of a locking device for a connecting port on a computer according to the present invention.
Figure 2:
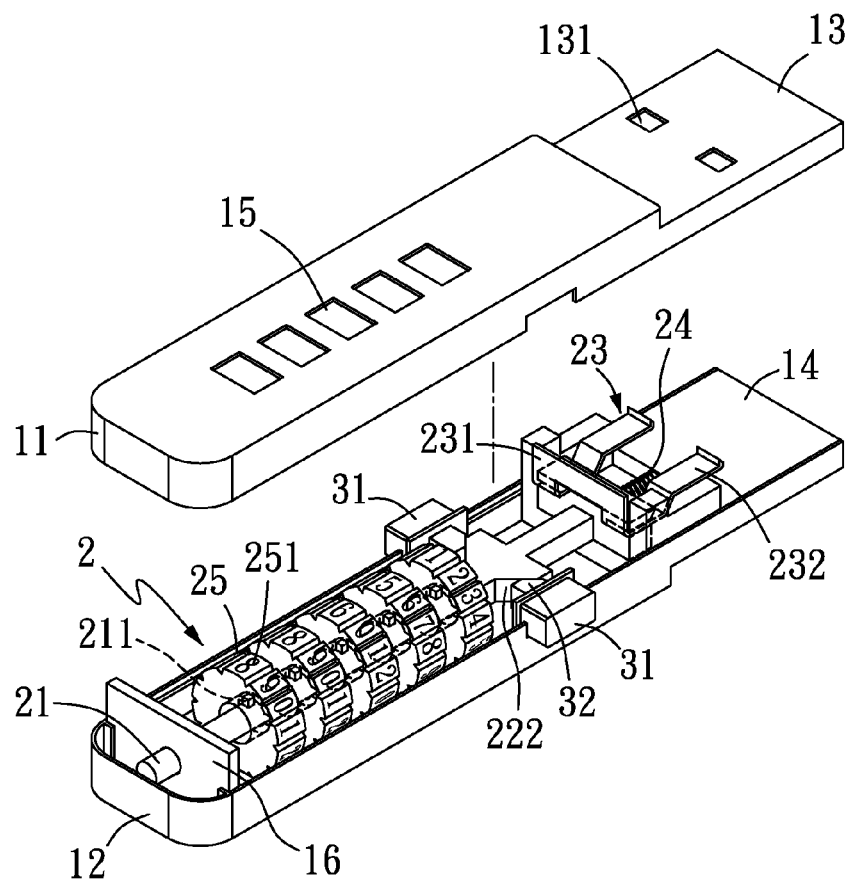
FIG. 2 is a partially assembled perspective view of FIG. 1.
Figure 3:
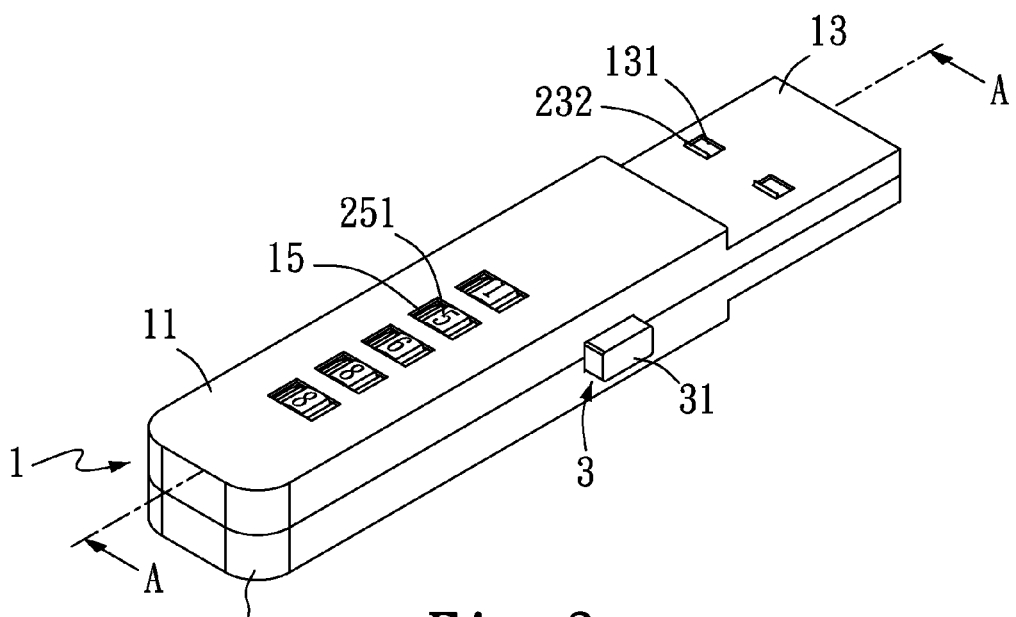
FIG. 3 is a fully assembled perspective view of FIG. 1.
Figure 4:
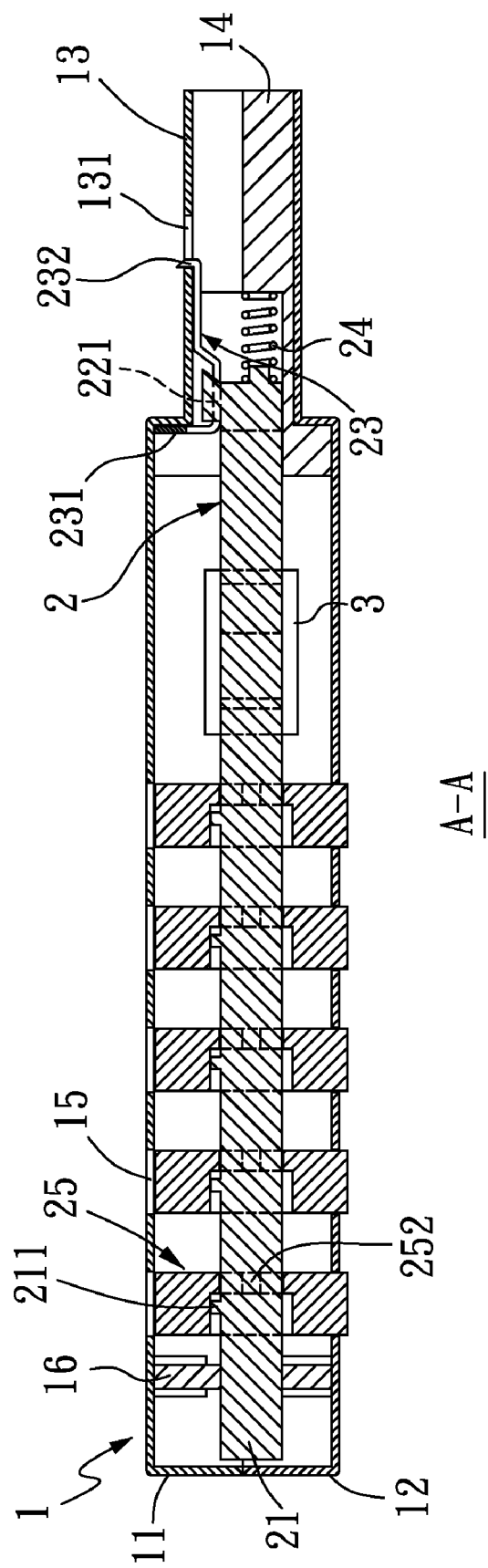
FIG. 4 is a sectional view taken along line A-A of FIG. 3.

Please refer to FIGS. 1, 2, and 3 that are fully exploded, partially assembled, and fully assembled perspective views, respectively, of a locking device for a connecting port on a computer according to the present invention, and to FIG. 4 that is a sectional view taken along line A-A of FIG. 3. As shown, the locking device according to the present invention includes an enclosure 1, a locking unit 2, and at least one push button 3.

The enclosure 1 is composed of an upper cover 11 and a lower cover 12. A first end of the enclosure 1 forms an insertion section 13 having two corresponding holes 131 provided thereon. The insertion section 13 can be configured as a USB plug. A fixing seat 14 is located in the insertion section 13 of the enclosure 1. A plurality of windows 15 are formed on at least one of an upper and a lower side of the enclosure 1. And, a supporting plate 16 is located at and in a second end of the enclosure 1 opposite to the first end.

The locking unit 2 is arranged in the enclosure 1, and includes a rod 21 movably connected at one of two ends to the supporting plate 16 and having a line of teeth 211 axially spaced on and along an outer circumferential surface thereof; a push member 22 located at the other end of the rod 21 and having an engaging portion 221; a hooking member 23 movably connected to the engaging portion 221; an elastic member 24 located between the push member 22 and the fixing seat 14; and a plurality of rotating discs 25 sequentially fitted on and around the rod 21 between the supporting plate 16 and the push member 22. An inclined shoulder portion 222 is formed on at least one lateral side of the push member 22. The hooking member 23 has a first end in the form of a cross plate 231 confined in the enclosure 1, and an opposite second end in the form of two hooking arms 232 detachably extended into the holes 131 on the insertion section 13. The rotating discs 25 each are provided along an outer circumferential surface with a plurality of sequentially arranged numeral areas 251, such that the numeral areas 251 on the same one rotating disc 25 can be selectively exposed from one of the windows 15 corresponding to that rotating disc 25 by turning the rotating disc 25. The rotating discs 25 each are also provided on an inner circumferential surface with a notch 252, which has dimensions corresponding to that of the teeth 211.

The push button 3 is movably arranged on at least one lateral side of the enclosure 1. A first end of the push button 3 is a push section 31 outward protruded from the enclosure 1, and an opposite second end of the push button 3 is a driving head 32 interfering with the inclined shoulder portion 222 of the push member 22.

Figure 5:
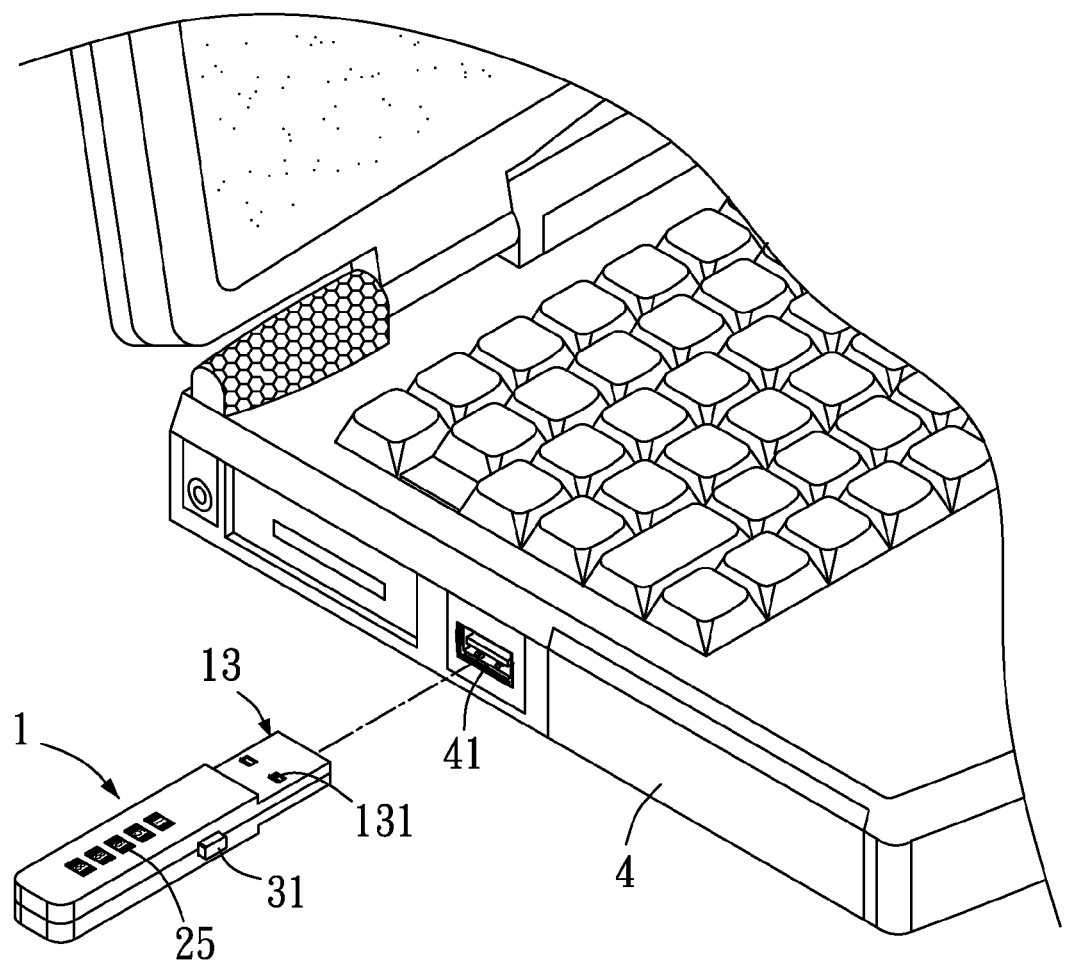
FIG. 5 is a perspective view showing the use of the locking device of the present invention to lock a connecting port provided on a computer.
Figure 6:
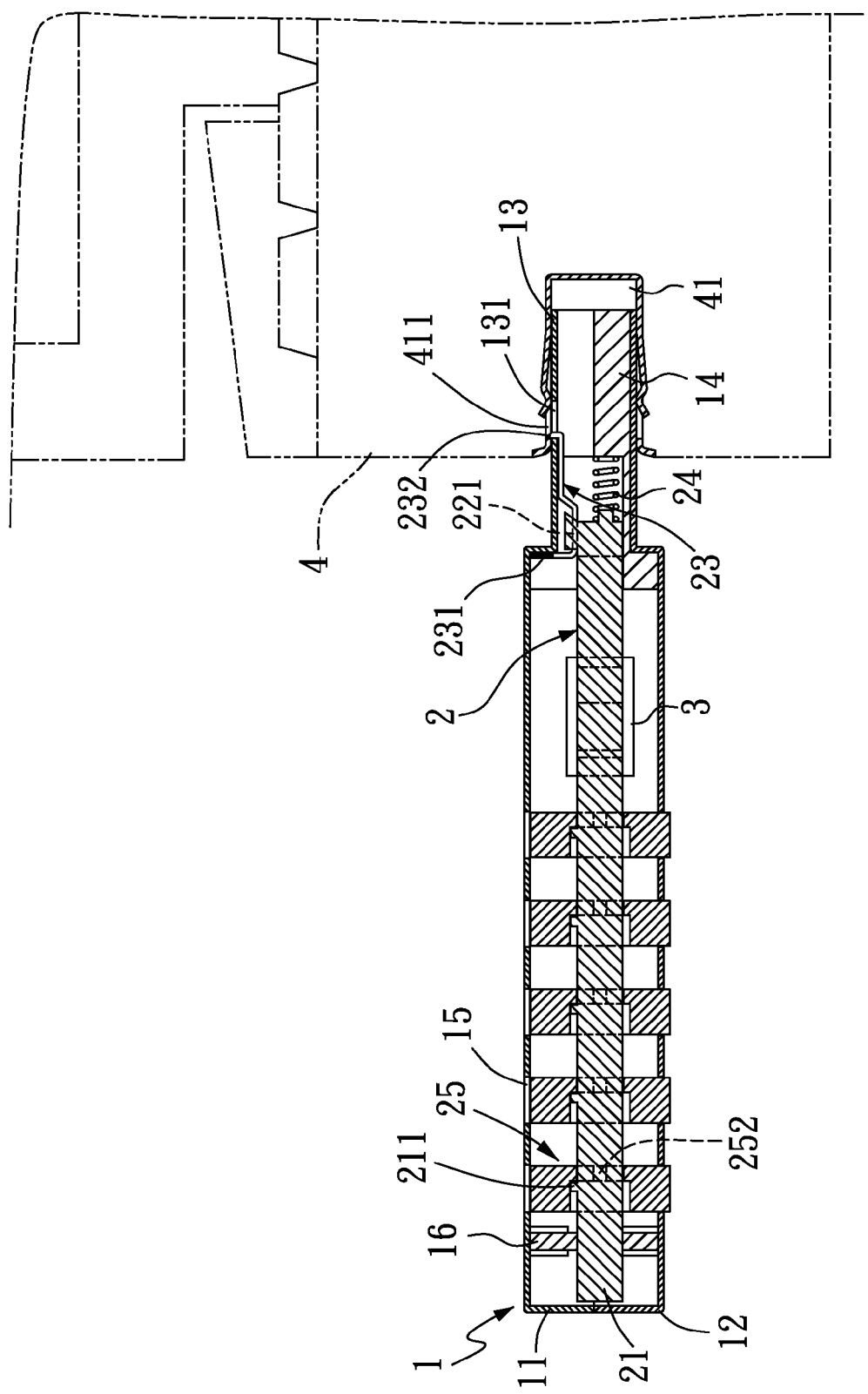
FIG. 6 is a sectional view showing the locking device of the present invention having been locked to the connecting port.
Figure 7:
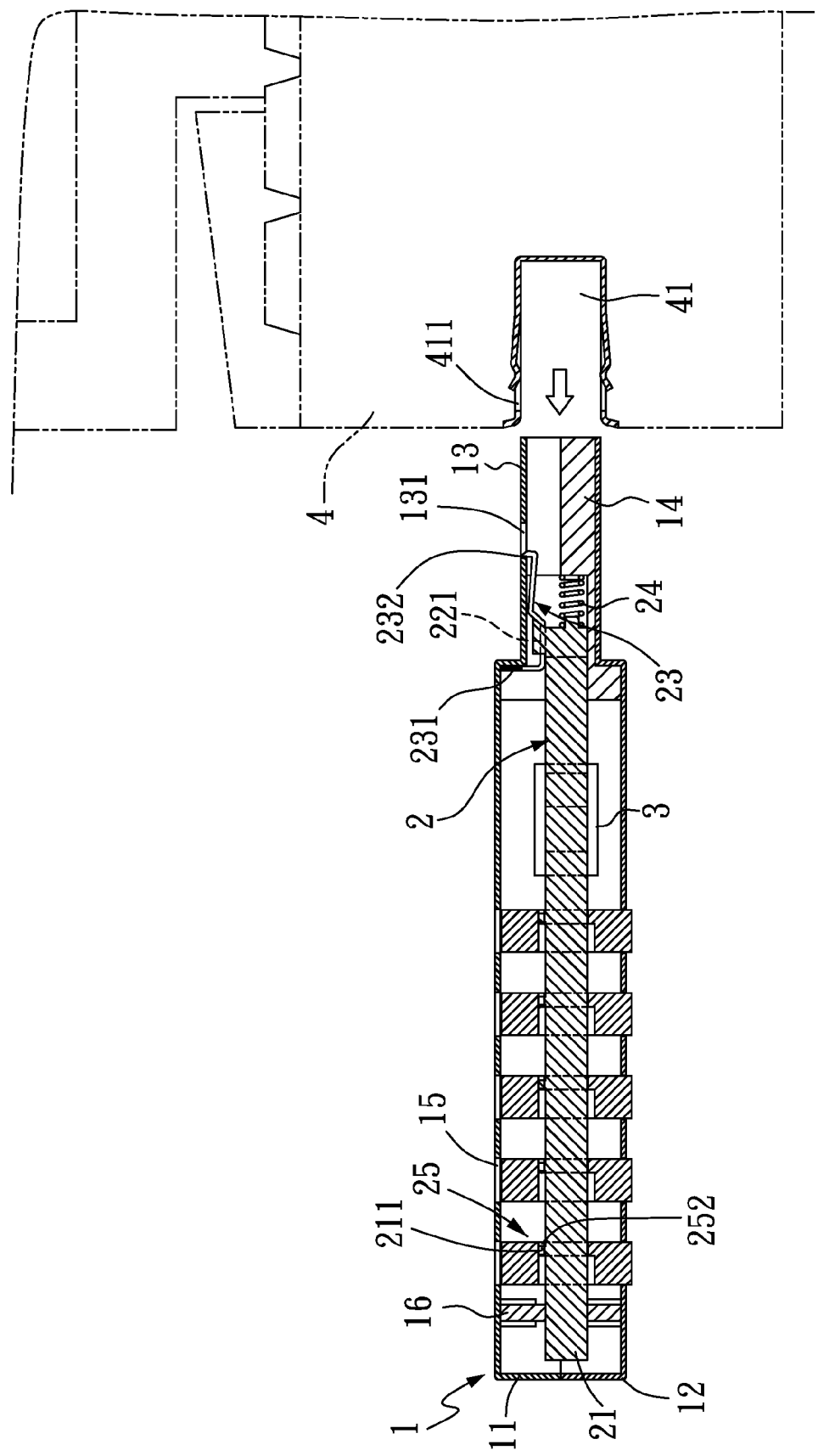
FIG. 7 is a sectional view showing the locking device of the present invention being separated from the connecting port to unlock the latter.

FIG. 5 is a perspective view showing the use of the locking device of the present invention to lock a connecting port 41 on a computer case of a computer 4, and FIGS. 6 and 7 are sectional views showing the locking device of the present invention locked to and detached from the connecting port 41, respectively. To use the locking device of the present invention to lock the connecting port 41, which can be a USB connecting port, the insertion section 13 of the enclosure 1 is directly inserted into the USB connecting port 41 on the computer case of the computer 4. At this point, the hooking arms 232 on the hooking member 23 of the locking unit 2 are elastically compressed downward by an inner wall surface of the USB connecting port 41. When the insertion section 13 has been moved further into the USB connecting port 41 with the hooking arms 232 aligned with two retaining holes 411 formed on the inner wall surface of the USB connecting port 41, the hooking arms 232 are no longer compressed by the innerwall surface of the USB connecting port 41 and automatically spring out of the holes 131 into the retaining holes 411. When the locking device is in a locked state, the notches 252 separately formed on the inner circumferential surfaces of the rotating discs 25 are dislocated from the line of teeth 211 on the rod 21, and the driving head 32 of the push button 3 pushed against the inclined shoulder portion 222 of the push member 22 could not drive the rod 21 forward. Accordingly, with the hooking arms 232 of the locking unit 2 extended into and held to the retaining holes 411, the insertion section 13 of the enclosure 1 is locked to the USB connecting port 41 on the computer 4, preventing any other external storage device from being plugged in the USB connecting port 41 to access data stored in the computer 4 without authorization.

When an authorized user of the computer 4 desires to use the USB connecting port 41, the user can turn the rotating discs 25 of the locking unit 2 via the windows 15, so that a correct combination of numerals is shown on the numeral areas 251 in the windows 252. At this point, the notches 252 on the rotating discs 25 are aligned with one another, allowing the line of teeth 211 on the rod 21 to move through the notches 252. With the rotating discs 25 having been turned to show the correct numeral combination in the windows, the user can easily push the push section 31 of the push button 3 inward. When doing this, the driving head 32 of the push button 3 interferes with and slides along the inclined shoulder portion 222 to drive the push member 22 forward. At this point, the push member 22 is moved toward the fixing seat 14 to compress the elastic member 24, and the engaging portion 221 urges and biases the hooking arms 232 of the hooking member 23 downward, bringing the hooking arms 232 to retract from the retaining holes 411 of the USB connecting port 41 into the holes 131 of the insertion section 13, permitting the user to remove the insertion section 13 of the enclosure 1 from the USB connection port 41.

In conclusion, in the locking device of the present invention, by means of the locking unit, the insertion section of the enclosure can be locked to a connecting port on a computer to hinder any unauthorized external storage device from linking with the connecting port. Therefore, the data stored in the computer are protected from unauthorized access. With the above arrangements, the locking device of the present invention effectively overcomes the safety problems in the conventional connecting port on the computer, and is therefore improved and practical for use to meet general users' requirements.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A locking device for a connecting port on a computer, comprising:

an enclosure having an insertion section formed at a first end thereof, the insertion section being provided with two corresponding holes and having a fixing seat received therein; a plurality of windows formed on at least one of an upper and a lower side of the enclosure; and a supporting plate located in the enclosure at a second end thereof opposite to the first end;

a locking unit arranged in the enclosure and including a rod, a push member, a hooking member, an elastic member, and a plurality of rotating discs;

the rod having a line of teeth axially spaced on an outer circumferential surface thereof, and being movably connected at one of two ends to the supporting plate and fixedly connected at the other end to an end of the push member;

the push member being provided at another end opposite to the rod with an engaging portion;

the hooking member being movably connected to the push member by engaging with the engaging portion;

the hooking member having a first end in the form of a cross plate confined in the enclosure, and an opposite second end in the form of two hooking arms detachably extended into the holes on the insertion section;

the elastic member being located between the push member and the fixing seat; and the rotating discs being fitted on and around the rod, and each being provided along an outer circumferential surface with a plurality of sequentially arranged numeral areas, such that the numeral areas on the same one rotating disc can be selectively exposed from one of the windows on the enclosure corresponding to that rotating disc by turning the rotating disc; and the rotating discs each being provided on an inner circumferential surface with a notch, which has dimensions corresponding to that of the teeth; and at least one push button being movably arranged on at least one of two lateral sides of the enclosure to interfere with one side of the push member.

2. The locking device for a connecting port on a computer as claimed in claim 1, wherein the enclosure is composed of an upper cover and a lower cover.

3. The locking device for a connecting port on a computer as claimed in claim 1, wherein the insertion section is configured as a USB plug.

4. The locking device for a connecting port on a computer as claimed in claim 1, wherein the push member is formed on at least one side with an inclined shoulder portion, with which the push button interferes.

5. The locking device for a connecting port on a computer as claimed in claim 1, wherein the push button has a push section outward protruded from the enclosure, and a driving head opposite to the push section for interfering with one side of the push member.

* * * * *